United States Patent [19]

Brümmer et al.

[11] 4,448,441

[45] May 15, 1984

[54] INDEPENDENT FRONT AXLE SUSPENSION FOR PASSENGER CARS

[75] Inventors: Hans J. Brümmer, Kernen; Karlheinz Böse, Fellbach; Frank Knothe, Stuttgart; Hans-Hermann Keller, Notzingen; Henning Wallentowitz, Aichwald, all of Fed. Rep. of Germany

[73] Assignee: Daimler-Benz Aktiengesellschaft, Stuttgart, Fed. Rep. of Germany

[21] Appl. No.: 442,759

[22] Filed: Nov. 18, 1982

[30] Foreign Application Priority Data

Nov. 20, 1981 [DE] Fed. Rep. of Germany ....... 3145988

[51] Int. Cl.$^3$ ............................................... B60G 3/00
[52] U.S. Cl. ..................................... 280/691; 280/660; 280/675
[58] Field of Search ............... 280/660, 668, 675, 690, 280/691

[56] References Cited

U.S. PATENT DOCUMENTS

| | | | |
|---|---|---|---|
| 3,229,783 | 1/1966 | Müller | 280/690 |
| 4,084,837 | 4/1978 | Milner | 280/691 |
| 4,145,072 | 3/1979 | Matschinsky | 280/668 |
| 4,341,396 | 7/1982 | Decouzon et al. | 280/675 |

*Primary Examiner*—Joseph F. Peters, Jr.
*Assistant Examiner*—Kenneth R. Rice

*Attorney, Agent, or Firm*—Craig & Burns

[57] ABSTRACT

This invention relates to an independent front axle suspension for passenger cars. The suspension possesses a lower guide member, which is set transversely to the longitudinal direction of the vehicle and is flexibly coupled to the vehicle body, and a shock absorber strut, or spring strut, which is located between this guide member and the vehicle body, on which strut a wheel carrier is retained. This wheel carrier is able to move about a steering axis and is coupled to a steering track rod extending in the transverse direction of the vehicle.

The total mass of the front axle suspension is capable of vibrating about an instantaneous rotation axis which extends downwards from the upper coupling point of the shock absorber strut, or spring strut. This axis is orientated in space in such a manner that it intersects the axis of the steering track rod, or crosses this axis, lying at least in close proximity thereto.

This association of the instantaneous rotation axis with respect to the steering track rod enables longitudinal forces, which act on the guide member and induce wheel vibrations in the longitudinal direction, to be prevented from becoming effective, any longer, in the longitudinal direction of the steering track rod, at least to the extent of their exerting disadvantageous effects on the steering gear and/or on the steering wheel.

7 Claims, 12 Drawing Figures

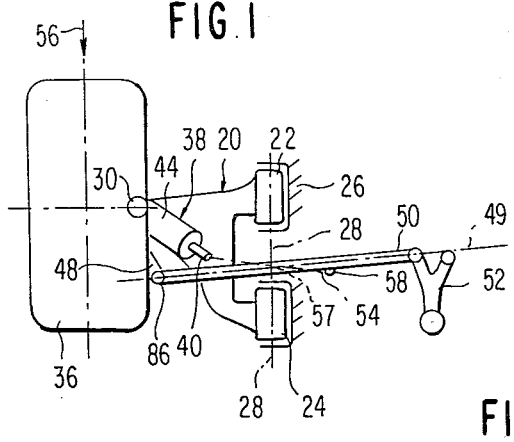
FIG. 1
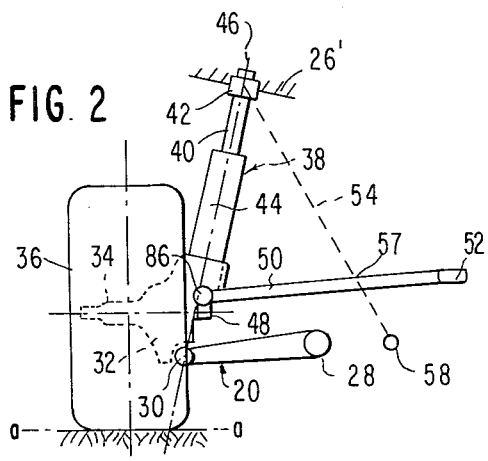
FIG. 2
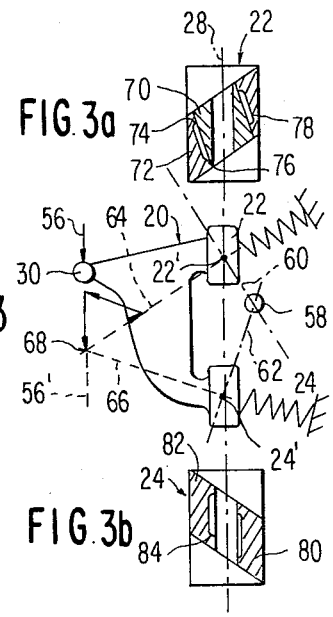
FIG. 3a
FIG. 3
FIG. 3b
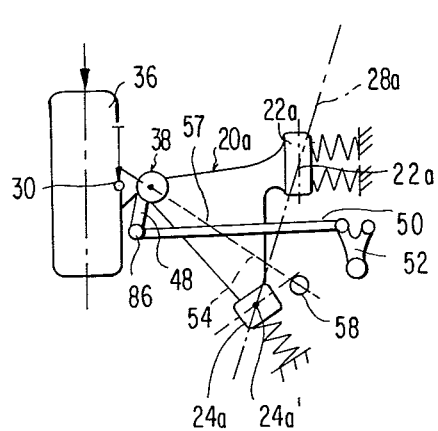
FIG. 4
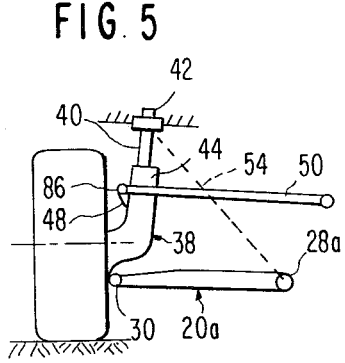
FIG. 5

INDEPENDENT FRONT AXLE SUSPENSION FOR PASSENGER CARS

Technical Field

The invention relates to an independent front-axle suspension for passenger cars.

Background Art

Compared to double-wishbone axle-suspensions and double trailing-arm axle-suspensions, front-axle suspensions of the above mentioned type, equipped with a shock absorber strut, or a spring strut, are distinguished by less elaborate construction. For this reason, they require less space for their accommodation and are relatively inexpensive to manufacture.

However, front-axle suspensions of this type suffer from one fault, which manifests itself in the fact that the steering becomes subject to disturbance at driving speeds between 80 and 120 km/h. This disturbance is understood to take the form of vibrations, they originate from the condition wherein, while a passenger car equipped with front-axle suspensions of this type, is being driven, an imaginary, or instantaneous, rotation-axis manifests itself, in space. This axis is related to the total mass of the individual front-axle suspensions and about which axis the mass-unit begins to vibrate. These rotational vibrations are introduced, via the steering track rod, into the steering system of the vehicle and manifest themselves visibly, and through feel, as rotational vibrations of the steering wheel.

Although rotational vibrations of this nature do not adversely affect driving safety, they nevertheless constitute a nuisance for the driver, because they excite the hand/arm system. In specialist literature, this vibration phenomenon is most generally termed shimmy.

Irregularities in the tires are regarded as the cause of the generation, in the steering system, of vibrations of this nature. These tire characteristics excite the front axle, while factors influencing the intensity of these rotational vibrations include the axle-geometry, the flexibility of the axle-suspensions, in the longitudinal direction; the resilience of the steering and the moment of inertia of the steering wheel.

In experiments relating to this vibration phenomenon, it has been found that a front axle which is attached very stiffly to the vehicle, in its longitudinal direction, is not, in general, susceptible to shimmy. In this case, the axis about which a front wheel instantaneously rotates is constrained to come, as it is established, nearer to the center of gravity of the wheel than in the case of a wheel-suspension which is flexible longitudinally. The conclusion drawn from this discovery is that this distance should be as small as possible in front-axle suspensions of this type.

However, disadvantages with regard to ride-comfort result from a front-axle suspension which is designed to be stiff in the longitudinal direction. Specifically, this suspension transmits higher frequency vibrations both to the steering system and to the vehicle body.

An object underlying the invention is accordingly to configure a front-axle suspension possessing the features whereby a steering wheel is subject to no rotational vibrations and/or that disturbances of the steering are avoided, and to enable, with front-axle suspensions of this type, an increase in steering resilience. Hence, an object of this invention is to increase the driving comfort to a considerable extent.

Summary of the Invention

The invention is therefore based on the knowledge that transmission of longitudinal wheel-vibrations to the steering system can be substantially prevented. This can be achieved when the instantaneous rotation-axis is married into the basic design of an axle in such a manner that the longitudinal forces, which give rise to the longitudinal wheel vibrations, and which act on a guide member, cannot, at least any longer, break themselves down into partial forces, to the extent that a partial force can become effective in generating a disturbance in the longitudinal direction of the steering track rod.

According to the invention, the association of the instantaneous rotation-axis and of the axis of the steering track rod leads, in contrast, to a condition wherein longitudinal vibrations, which are transmitted to the guide member merely cause the steering track rod still to vibrate essentially about its coupling-point, at the steering-gear arm, for example. The amplitude of these vibrations are so small that they can no longer adversely affect the steering gear.

Accordingly, the instantaneous rotation-axis can also extend outside the steering track rod at an appropriate radial distance from its periphery. The instantaneous rotation-axis can equally well cross or intersect the axis of the steering track rod at a point on the prolongation thereof.

The wheel movements in the longitudinal direction of the vehicle, which generate the vibration of the steering track rod about its coupling point to the steering gear, can be kept to a minimum value, because only small wheel rotation angles result in this case. By this means, the excitation of the vibration can be kept small by setting up slip-induced lateral forces.

The guide member can be configured in different ways. It can, for example, form a one-piece wishbone, or divided wishbone, or a one-piece or divided semi-trailing arm. In every case, it is advantageous, when designing the guide member, to configure the design as a rigid wishbone. It is particularly favorable to arrange the intersection point of all the lines of action to coincide with the point at which the steering track rod is coupled to the wheel carrier.

Further, the point at which the steering track rod is coupled to the wheel-carrier, or to the shock absorber strut, can be a real coupling point or an imaginary coupling point.

These and other objects, features and advantages of the present invention will become more apparent from the following description when taken in connection with the accompanying drawings which show, for purposes of illustration only, several embodiments in accordance with the present invention, and wherein, FIG. 1 represents, diagrammatically, a plan view of a first illustrative embodiment of a front-axle suspension for passenger cars, which suspension is equipped with a shock absorber strut, possesses a wheel carrier guide member which is designed as a rigid wishbone, and possesses a steering track rod which acts on the wheel carrier above the wishbone;

FIG. 2 represents, diagrammatically, a view of the front axle suspension according to FIG. 1, seen from the rear;

FIG. 3 represents, diagrammatically, a layout plan for illustrating the directions of forces acting, in common plane, on the wishbone according to FIGS. 1 and 2;

FIGS. 3a and 3b represent, diagrammatically, longitudinal sections through the pivot-bearings of the wishbone, shown on an enlarged scale;

FIG. 4 represents, diagrammatically, a plan view of a second illustrative embodiment of a front axle suspension for passenger cars, which likewise possesses a rigid wishbone and is likewise equipped with a shock absorber strut, the steering track rod of this suspension being coupled to the outer tube of the shock absorber strut at a point located a long distance above the wishbone;

FIG. 5 represents, diagrammatically, a view of the front axle suspension according to FIG. 4, seen from the rear;

Figure 6:
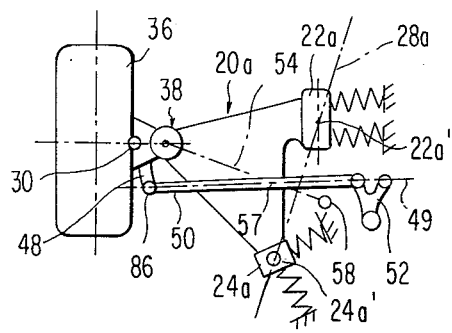
Figure 7:
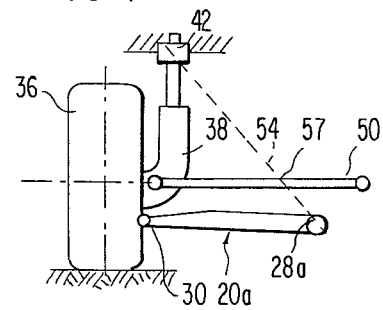
Figure 8:
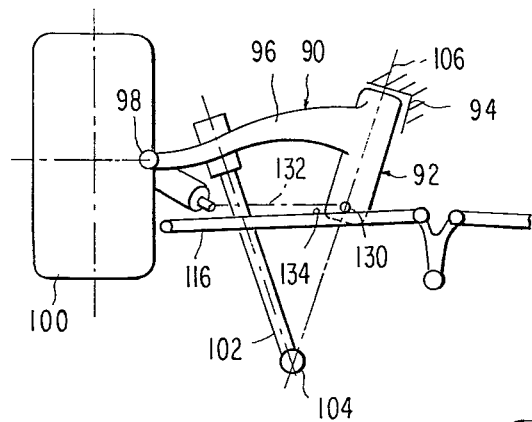
Figure 9:
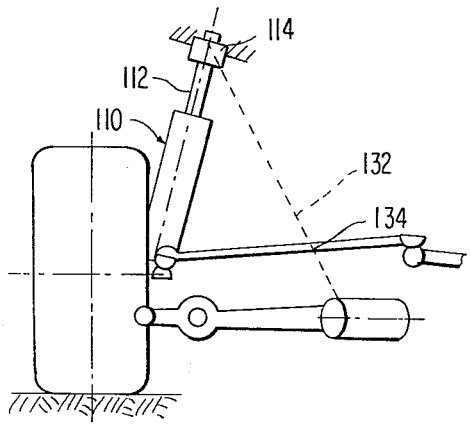
Figure 10:
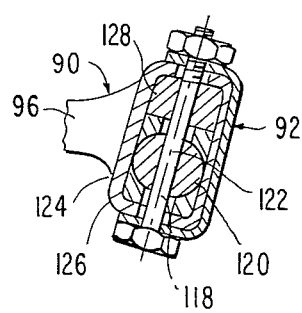

FIGS. 6 and 7, which relate to FIGS. 4 and 5, represent diagrams for illustrating a third illustrative embodiment of a front axle suspension, the steering track rod of this suspension being located a short distance above the wishbone, and acting on the wheel carrier;

FIG. 8 represents, diagrammatically, a plan view of a fourth illustrative embodiment of a front axle suspension which is equipped with a shock absorber strut and a divided wishbone;

FIG. 9 represents, diagrammatically, a view of the front axle suspension according to FIG. 8 seen from the rear; and FIG. 10 represents, diagrammatically, a longitudinal section, shown on an enlarged scale, through the pivot bearing of the wishbone of the front axle suspension according to FIGS. 8 and 9.

Description of the Invention

The front axle suspension, shown in FIGS. 1 and 2, possesses a rigid wishbone 20, which is equipped with two flexible pivot bearings 22, 24, which are arranged, on this wishbone, spaced apart from one another and, for example, coaxially with one another. These pivot bearings are preferably designed as rubber/metal bearings, and can pivot, on a vehicle body 26 or on a vehicle subframe, about a pivot axis 28. The latter extends, for example, essentially parallel to the longitudinal axis of the vehicle.

A supporting joint is marked 30. This joint is inserted, for example, into the wishbone and supports a wheel carrier 32 from below. A front wheel 36 is mounted on the stub axle 34 of this wheel carrier.

A shock absorber strut, of a known type, is marked, in its entirety, 38. This strut is located between the wishbone 20 and an upper portion 26' of the vehicle body 26. This strut could also be a spring strut, which is known per se. The upper end of its piston rod 40 is bolted to the vehicle body, in a manner permitting articulation, by means of a flexible thrust-mounting 42.

The wheel carrier 32 is rigidly connected, in a known manner, to the lower end of an outer tube 44 of the shock absorber strut 38. It forms, together with the strut, one constructional unit.

The steering axis of the front axle suspension is defined by a line 46 which connects the coupling point of the shock absorber strut, which point is located in the upper thrust mounting 42, with the midpoint of the lower supporting joint 30. This connecting line approximately coincides, in the present illustrative embodiment, with the longitudinal axis of the shock absorber strut.

A steering track rod 50, which extends in the transverse direction of the vehicle and is coupled to a steering arm 48 of the wheel carrier 32, is employed to twist the front wheel 36 about the steering axis 46. This steering track rod 50 is connected, for example, to a steering gear arm 52 of a steering gear, in a manner permitting movement.

An imaginary axis 54 is designated, in the following text, as the instantaneous rotation axis. As is known, the total mass of the front axle suspension, which has been described and which possesses a shock absorber strut, begins to vibrate about this axis at driving speeds between 80 and 120 km/h. According to the invention, the axis is orientated in space, relative to the steering track rod 50. The axis is orientated so that, when a longitudinal force acts on the front wheel 36 or on the supporting limb 30 of the wishbone 20, this force cannot any longer break itself down, in the vibrating system into components with different lines of action. Alternatively, it can only break down, in this manner, to an extent such that a partial force which, under some conditions, may still be effective, can no longer exert an effect, via the steering track rod 50, on the steering gear arm 52, so that the vibrations of the front axle suspension manifest themselves at the steering wheel, in a disturbing manner. The longitudinal force is indicated by the arrow 56 and defined by its length.

The location, in space, of this instantaneous rotation axis 54 is determined, on the one hand, by the coupling point of the piston rod 40 of the shock absorber strut 38 in the upper thrust-bearing 42, which is rigidly attached to the vehicle body, and, on the other hand, by the flexibilities at the coupling points of the wishbone 20. These points must, as is yet to be explained below, by reference to FIG. 3, be laid out in such a manner that the instantaneous rotation axis pierces the plane of a wishbone. This plane is defined by the midpoint of the supporting joint 30, as well as by the coupling point 22', 24' of the wishbone 20. Intersection is at a point such that, as FIG. 1 shows, the axis 49 of the steering track rod 50 and the instantaneous rotation axis 54 intersect one another, as occurs, for example, at 57.

At the same time, the point marked 58, at which the plane of the wishbone is pierced, defines a rotation pole for the plane force system. This can be seen from the layout diagram according to FIG. 3. The polar vectors defining, by their common point of intersection, the piercing point 58, or rotation pole, are marked 60 and 62 in this diagram. At the same time, the position of the piercing point 58, in the plane of the wishbone, depends on the direction in which the steering track rod 50 and its axis 49 extend, on the distance between the wheel contact plane a-a and the point at which the steering track rod 50 is coupled to the steering arm 48 on the distance between the wheel contact plane a-a and the upper coupling point of the shock absorber strut 38 in the thrust-bearing 42.

The position of the piercing point 58 is obtained by appropriately designing the degrees of flexibility in the flexible pivot bearings 22, 24 of the wishbone. Their flexibility in the transverse direction has to be greater for this purpose, than their flexibility in the longitudinal direction. The directions of the force action lines, which lines pierce the coupling points 22', 24' of the wishbone 20, are perpendicular to the polar vectors 60, 62 and are marked 64 and 66, are consequently defined by the piercing point 58. The force action lines must intersect on the line 56' of action of the longitudinal force 56, which acts on the supporting joint 30, in order to achieve the equilibration of the forces for the purpose of damping the system. This system is capable of vibrating.

The forces, acting at the common point 68 of intersection of all the force action lines 56′ 64, 66 and lying in a common plane, consequently form a closed polygon of forces which is indicated, in FIG. 3, by arrows.

FIGS. 3a and 3b show possible embodiments of the pivot bearings 22, 24, which must be designed with different flexibilities in the transverse direction.

It can be seen, from FIG. 3, that the flexibility of the pivot bearing 22, in the transverse direction, should be greater than that of the pivot bearing 24. This is evident from the direction of the force action line 64.

For this purpose, the pivot bearing 22 is, for example, equipped with two resiliently flexible bodies 70, 72. These bodies are located one inside the other and are preferably composed of rubber, while the pivot bearing 24 possesses merely one body 80 of this type.

The principal direction of the flexible bodies 70, 72 extends, in the direction of the force action line 64, obliquely with respect to the pivot axis 28 of the wishbone 20. It is possible to achieve a higher spring rate in the transverse direction, compared to the pivot bearing 24, by means of the combination of the two flexible bodies 70, 72. In this arrangement, the inner body 70 is received, inside the outer body 72, by two inner, annular peripheral edges 74, 76, which are arranged at a distance from one another. There is accordingly an annular space 78 between the two bodies 70, 72 by means of which space it is possible to achieve the appropriately lower stiffness in the transverse direction. The peripheral edges 74, 76 can be appropriately displaced when the force acts in the direction of the line 64 of action, despite the incompressibility of the material in the annular space 78.

The resiliently flexible body 80 of the pivot bearing 24 possesses a configuration which matches the outer body 72 of the pivot bearing 22. Its principal direction extends in the direction of the force-action line 66. Its inner peripheral edges 82, 84 directly receive the pivot axis 28. The reduced stiffness, in the transverse direction, compared to the pivot bearing 22, is achieved as a result of the direction of the force and by the reduced mass of flexible material in this pivot bearing. The specific configuration of the pivot bearings can also be different or the bearings can have configurations which differ from one another. With regard to the arrangement in space, of the instantaneous rotation axis 54, it should also be stated, for completeness, that the common point 68 of intersection of all the force action lines is preferably selected in a manner such that it coincides with the point 86 at which the steering track rod 50 is coupled to the steering arm 48.

The point 68 of intersection of the force action lines could also lie on the force action line 56′, at a distance from the coupling point 86 of the steering track rod, which would then, at the least, result in a corresponding displacement of the point 57 of intersection, from the instantaneous rotation axis 54 and the steering track rod 50.

In the front axle suspension described above, the steering track rod 50 is situated above the wishbone 20, at a comparatively small distance from it.

FIGS. 4 to 7 show different versions of the coupling on of a rigid wishbone. In these Figures, parts which are identical to those in FIGS. 1 and 2 are marked with the same reference numbers. The reference numbers of the parts having a different design and/or exhibiting a different arrangement are provided with the index a. In the case of the front axle suspension according to FIGS 4 and 5, the pivot bearings 22a, 24a of the rigid wishbone 20a define a pivot axis 28a which extends, from front to rear in an outward direction, at an angle to the longitudinal axis of the vehicle.

This orientation of the pivot axis renders it possible to use conventional flexible pivot bearings, that is to say pivot bearings which are known per se, both in the longitudinal and transverse directions, these pivot bearings having defined lines of action, as can be seen from FIG. 4.

However, the use of conventional rubber/metal bearings presupposes that, in order to effect the intersection of the instantaneous rotation axis 54 and the axis of the steering track rod 50, at 57, the steering track rod is located at a comparatively large distance above the wishbone 20a, and the steering arm 48 is attached to the outer tube 44 of the shock absorber strut 38, in order to twist this strut.

If it is desired, analogously to the front axle suspension according to FIGS. 1 and 2, to locate the steering track rod 50 lower down, the conditions relating to the pivot bearing 24a alter, insofar as this repositioning displaces the point 57 of intersection, defined by the steering track rod and the instantaneous rotation axis, in the direction of the pivot axis 28a, and because, as indicated in FIG. 6, the pivot bearing 24a must possess defined degrees of stiffness in the longitudinal and transverse directions.

The front axle suspension shown in FIGS. 8 and 9 is equipped with a divided wishbone, which is marked, in its entirety, 90. This wishbone possesses a link arm 96, which is coupled to the vehicle body 94 by means of a pivot bearing 92. It carries, in a conventional manner, a supporting joint 98 at its free end. This joint is intended to support a wheel carrier on which a front wheel 100 is mounted. The link arm 96 is flexibly supported, from the rear, by means of a supporting rod 102. The front end of this rod is flexibly retained inside the link arm for this purpose. Its rear end is couple to a coupling point of a supporting bearing 104 which is fixed to the vehicle body.

The pivot bearing 92 and the support bearing 104 define pivot axis 106. It extends from front to rear, in an outward direction at an angle to the longitudinal axis of the vehicle, analogously to the design represented in FIG. 4.

The wheel carrier which, for the sake of simplicity, is not represented in more detail, is fastened to the lower end of the outer tube of a shock absorber strut 110. The piston rod 112 of this strut is coupled, in a structurally identical manner, to an upper coupling point, which is defined by a thrust bearing 114, as is also the case in the axle suspensions previously described. A steering track rod, for steering the front wheel, is marked 116. This rod extends behind the shock absorber strut, at right angles to the longitudinal direction of the vehicle and is connected to the wheel carrier and to a steering gear arm in the manner already explained.

The pivot bearing 92 possesses a joint point 118, which is defined by a bearing ball 120, which is composed for example, of rubber, and through which an axle pin 122 passes. This axle pin defines the pivot axis 106. The bearing ball 120 is mounted in a bearing bed 124 which is complementary to its curved surface and which, in its turn, is retained in a bearing housing 126.

The axle pin 122 passes through a bearing body 128 which is designed with a high degree of flexibility in the transverse direction and which is situated in the region of the front end of the pivot bearing. At the same time, the axle pin 122 is held, with radial play, in the bearing housing 126. As a result of its low stiffness in the transverse direction, the bearing body 128 defines the longitudinal flexibility of the entire front axle suspension. There is no need for this bearing body to absorb forces in the direction of the pivot axis 106.

By means of the bearing ball 120, which forms a hinge joint, the piercing point 130 of the instantaneous rotation axis 132, which passes through the coupling point of the upper thrust bearing 114, is forcibly fixed.

Depending on how the bearing ball 120 of the pivot bearing 92 is located with respect to the steering track rod 116, the instantaneous rotation axis intersects the axis of the steering track rod, or lies close to the steering track rod, as is the case in the front axle suspension presented here, in which they cross at 134.

All the front axle suspensions which have been described are distinguished by flexibility in the longitudinal direction which can be considerably greater than in the known front axle suspensions, in which steering gear vibrations are suppressed.

If, in these suspensions, the instantaneous rotation axis intersects the steering track rod, the result is a lack of susceptibility to vibrations about the instantaneous rotation axis, because no partial force which is effective in the longitudinal direction of the steering track rod can, any longer, be generated from the longitudinal forces which are introduced into the supporting joint of the wishbone.

While we have shown and described several embodiments in accordance with the present invention, it is understood that the same is not limited thereto but is susceptible of numerous changes and modifications as known to those skilled in the art and we therefore do not wish to be limited to the details shown and described herein, but intend to cover all such changes and modifications as are encompassed by the scope of the appended claims.

We claim:

1. An independent front axle suspension for passenger vehicles comprising a suspension possessing a lower guide member, extending transversely to the longitudinal direction of the vehicle body and being flexibly coupled to the vehicle body; the suspension also possessing a shock absorber strut located between the guide member and the vehicle body, the strut being connected at its upper end by a coupling point, via a flexible support, to the vehicle body; and possessing a wheel carrier connected to the shock absorber strut, in which suspension a wheel, mounted on the wheel carrier, is able to move about a steering axis defined by the upper coupling point of the shock absorber strut, coaxial with the shock absorber strut, to a guide link, the supporting joint being located a substantial distance below the axis of the wheel in which suspension, the wheel carrier or the shock absorber strut being coupled to a steering track rod extending in the transverse direction of the vehicle body, and in which suspension an instantaneous rotation axis is present, extending downwards from the upper coupling point of the shock absorber strut about which axis the total mass of the front axle suspension is capable of vibrating, the instantaneous rotation axis and the axis of the steering track rod substantially intersect one another.

2. The front axle suspension according to claim 1, wherein the instantaneous rotation axis crosses or intersects the axis of the steering track rod at a point on the prolongation thereof.

3. The front axle suspension according to claim 1, wherein the instantaneous rotation axis is situated in a vertical plane standing approximately normal to the plane in which the center of the wheel is located.

4. The front axle suspension according to claim 1, wherein the guide member of this suspension being designed as a rigid wishbone, which is flexibly mounted at bearing points which define a pivot axis extending obliquely to the transverse direction of the vehicle body, the position of a point at which the instantaneous rotation axis pierces the plane of the wishbone is defined by degrees of flexibility present at wishbone coupling points, these degrees of flexibility are smaller in the direction of its pivot axis than at right angles to this axis, and lines of action of the flexibilities of the wishbone mounting, which flexibilities are effective at right angles to the pivot axis, intersect on the line of action of a longitudinal force which acts on the wishbone.

5. The front axle suspension according to claim 4, wherein the intersection point of all lines of action coincides with the point at which the steering track rod is coupled to the wheel carrier.

6. The front axle suspension according to claim 1, wherein the position of the point at which the instantaneous rotation axis pierces the plane of the guide member is defined by a flexible hinge joint which, seen in the plan view of the front axle suspension, lines beneath the steering track rod or near one of its longitudinal edges.

7. The front axle suspension according to claim 1, wherein the shock absorber strut is a spring strut.

* * * * *